US006651946B1

(12) United States Patent
Thornton

(10) Patent No.: US 6,651,946 B1
(45) Date of Patent: Nov. 25, 2003

(54) CANE HOLDER ACCESSORY FOR WHEELCHAIR

(76) Inventor: Janet L. Thornton, 4343 Victory Dr., Apt. 24, Columbus, GA (US) 31903

( * ) Notice: Subject to any disclaimer, the term of this patent is extended or adjusted under 35 U.S.C. 154(b) by 0 days.

(21) Appl. No.: 10/326,934

(22) Filed: Dec. 23, 2002

(51) Int. Cl.[7] .......................... A47B 96/06; E04G 3/00; F16B 1/00; G09F 7/18

(52) U.S. Cl. .............................. 248/230.7; 248/231.81; 248/289.11; 248/315; 297/188.18; 297/188.2; 297/188.21

(58) Field of Search ......................... 248/230.7, 231.81, 248/314, 315, 289.11, 291.1; 297/188.2, 188.21, 188.18, 188.14; 280/304.1

(56) References Cited

U.S. PATENT DOCUMENTS

| | | | | | |
|---|---|---|---|---|---|
| 3,338,627 | A | * | 8/1967 | Frank | 297/153 |
| 3,338,628 | A | * | 8/1967 | Evans | 297/188.2 |
| 3,443,569 | A | | 5/1969 | Ernst | |
| 4,300,742 | A | * | 11/1981 | Hunn | 248/689 |
| 4,609,175 | A | | 9/1986 | Conover | |
| 4,779,884 | A | * | 10/1988 | Minati | 280/304.1 |
| D301,976 | S | * | 7/1989 | Greenhut et al. | D8/373 |
| 4,895,330 | A | * | 1/1990 | Anstead | 248/229.12 |
| 5,180,181 | A | * | 1/1993 | Letechipia | 280/304.1 |
| 5,456,437 | A | * | 10/1995 | Chander et al. | 248/316.7 |
| 5,524,657 | A | | 6/1996 | Jih | |
| 5,588,663 | A | * | 12/1996 | Rundle et al. | 280/304.1 |
| 5,597,148 | A | | 1/1997 | Gospodarich | |
| 5,626,398 | A | | 5/1997 | Wooldridge | |
| 5,678,798 | A | | 10/1997 | Little | |
| 6,142,350 | A | * | 11/2000 | Alexander | 224/407 |
| D437,679 | S | | 2/2001 | Lisowski et al. | |
| 6,227,511 | B1 | * | 5/2001 | De Costa | 248/311.2 |
| 6,565,053 | B1 | * | 5/2003 | Larky | 248/229.1 |

* cited by examiner

*Primary Examiner*—Leslie A. Braun
*Assistant Examiner*—Amy J. Sterling
(74) *Attorney, Agent, or Firm*—Donald R. Schoonover

(57) ABSTRACT

A cane holder includes a base plate and a gripping element that attaches the holder to an element of a wheelchair. A cane supporting plate is hingeably attached to the base plate and includes a bore, which slidably receives a cane. The cane holder aids in the usage of proper safety precautions. Because of its location, it provides a person with a convenient storage area to put a cane without causing the loss of stability.

2 Claims, 1 Drawing Sheet

CANE HOLDER ACCESSORY FOR WHEELCHAIR

BACKGROUND OF THE INVENTION

1. Field of the Invention

The present invention relates to the general art of wheelchairs, and to the particular field of accessories for wheelchairs.

2. Discussion of the Related Art

Most people who have a disability that affects their ambulation are insecure with their own stability. They feel uneasy when having to bend or lean over. This makes entering and/or exiting a wheelchair difficult and often requires the assistance of another person. Since it is not a given that anyone can assist a person entering or exiting a wheelchair, the person must often wait for a skilled health care provider to perform this function. This places such people at a disadvantage.

Therefore, there is a need for an accessory that will enable a person to enter or exit a wheelchair safely without requiring a great deal of assistance from others.

Many people ambulate with a cane after entering and exiting a wheelchair. Storing the cane on the wheelchair may be difficult, and locating that cane where it can be easily and conveniently reached when needed also presents many problems. For example: some people rest the cane on their lap; a practice that often results in the cane sliding off the lap and onto the floor. Some people store the cane upon entering the wheelchair by hooking it over the rear of the wheelchair, or by placing the cane between the wheels of the wheelchair. This practice often results in the loss of stability due to bending or leaning. Upon leaving the wheelchair, trying to retrieve a walking cane from the back of the chair or from between the wheels of the chair can involve some awkward twisting and may cause the chair's user to accidentally fall onto the floor.

Therefore, there is a need for an accessory for a wheelchair that stores a cane in an accessible and convenient location on the wheelchair.

PRINCIPAL OBJECTS OF THE INVENTION

It is a main object of the present invention to provide an accessory for a wheelchair that will store a cane on the wheelchair.

It is another object of the present invention to provide an accessory for a wheelchair that will store a cane on the wheelchair in a convenient and easily accessible location.

It is another object of the present invention to provide an accessory for a wheelchair that will store a cane on the wheelchair. The accessory can be stored out of the way when not in use.

SUMMARY OF THE INVENTION

These, and other, objects are achieved by a holder for a cane that is attached to an element of a wheelchair, such as the arm of the wheelchair. The holder has three main parts: a base plate, a gripping element for releasably attaching the holder to the wheelchair and a cane holding plate. The holder can be located and positioned to orient a cane so a person can hold onto the arm of the wheelchair as they enter or exit the wheelchair and the cane will be stable. The cane can then be withdrawn from the holder and used in the manner of a cane. The holder can be folded up to be located out of the way when not in use.

The holder embodying the present invention will eliminate excessive bending and leaning of a wheelchair user by providing a specific holding place on the wheelchair to hold a walking cane. The placement of the holder is at a comfortable reach and will require very little bending depending on the height of the person or the height of the chair. Therefore, persons no longer have to risk falling while trying to reach behind the chair to hang his or her cane, or have to bend over to rest the cane on the wheel of the wheelchair. The holder aides in the safety of the Sit-To-Stand protocol given persons with physical disabilities that affects ambulating.

BRIEF DESCRIPTION OF THE DRAWING FIGURES

DETAILED DESCRIPTION OF THE PREFERRED EMBODIMENT

Figure 2:
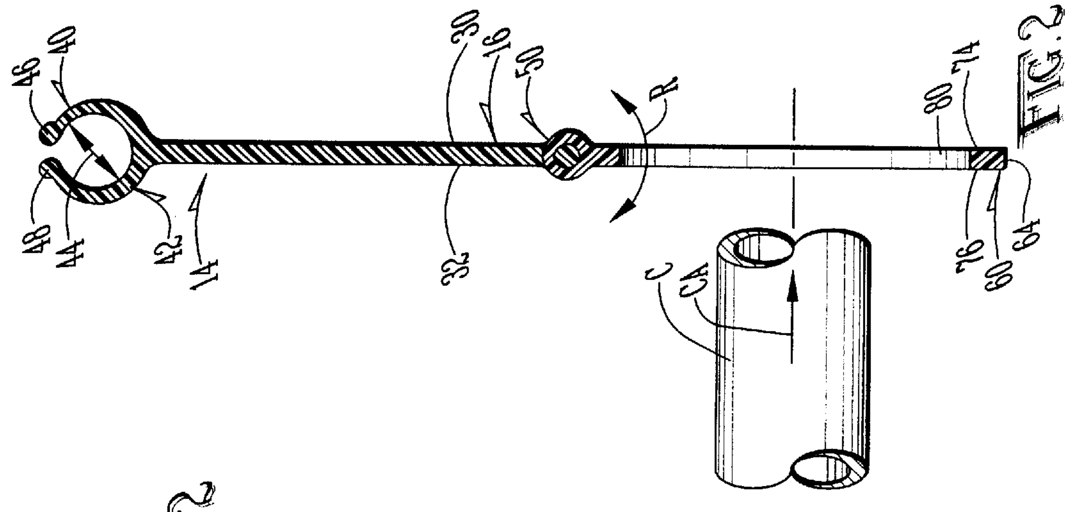
FIG. 2 is an elevational view taken along line 2—2 of FIG. 1.

Other objects, features and advantages of the invention will become apparent from a consideration of the following detailed description and the accompanying drawings.

As shown in the figures, the invention is embodied in a holder 10 for a cane C. The holder 10 provides safe and easy access to a specialized holding place for a cane. The holder 10 can be used to carry a walking cane when a wheelchair is in motion and the cane will not interfere with operation of the wheelchair. However, the cane will be positioned for easy access to assist a user in entering or exiting the wheelchair or for use in walking. Holder 10 is attached to a wheelchair element 12, such as the arm of a wheelchair or another convenient element of the wheelchair. The element 12 is only partially shown in FIG. 1 to indicate that any suitable element of the wheelchair can be used.

Holder 10 comprises a body unit 14 which is releasably attached to the wheelchair element 12 when in an operative condition. Body unit 14 includes a base plate 16 having a first side 18, a second side 20, and a width dimension 22 which extends between the first side 18 and the second side 20. Base plate 16 further includes a first end 24, a second end 26 and a length dimension 28 which extends between the first end 24 and the second end 26. Base plate 14 further includes a first face 30, a second face 32 and a thickness dimension 34 extending between the first face 30 and the second face 32.

Figure 1:
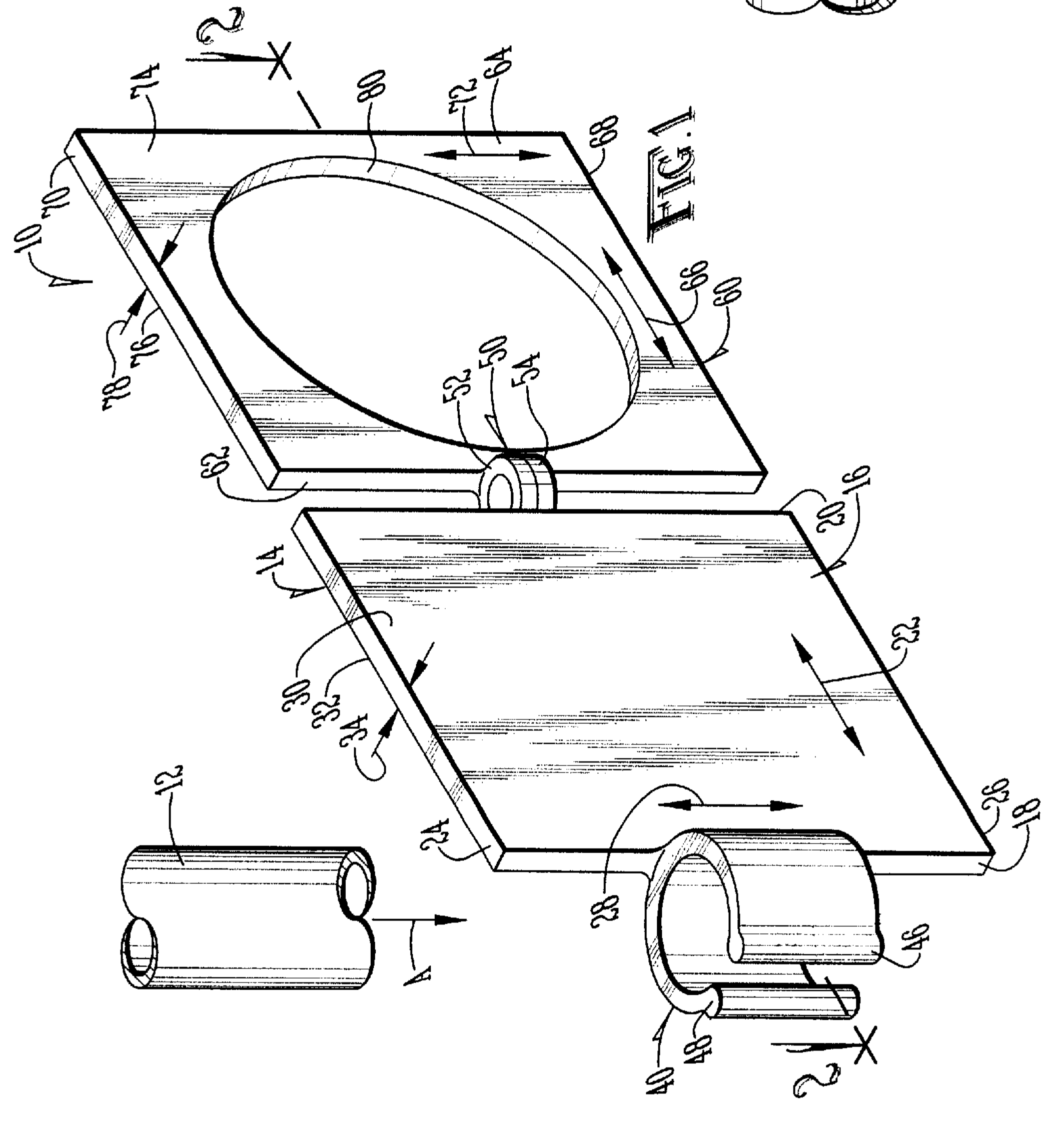
FIG. 1 is a perspective view of the holder embodying the present invention.

A gripping element 40 is fixed to the first side 18 of the base plate 16. The gripping element 40 includes a U-shaped body 42 having an inner diameter 44 and is releasably mounted on the wheelchair element 12 when in an operative condition. The gripping element 40 further includes a first end 46 on the U-shaped body 42 and a second end 48 on the U-shaped body 42. The second end 48 of the U-shaped body 42 is spaced apart from the first end 46 of the U-shaped body 42. The ends 46, 48 of the U-shaped body 42 and the U-shaped body 42 itself are arranged so the body 42 will flex to permit the gripping element 40 to fit around the wheelchair element 12 and then will be held in position by the resilience of the body 42. Attachment of the gripping element 40 to the wheelchair element 12 is indicated in FIG. 1 by arrow A.

A hinge unit 50 is fixed to the second side 20 of the base plate 16. The hinge unit 50 includes a first element 52 fixed to the second side 20 of the base plate 16 and a second element 54 rotatably attached to the first element 52 of the hinge unit 50. The hinge unit 50 rotates as indicated by arrow R in FIG. 2.

A cane supporting plate 60 releasably engages cane C to hold the cane in the desired position on the wheelchair. Cane supporting plate 60 includes a first side 62 which is located adjacent to second side 20 of the base plate 16 when in the open condition shown in FIG. 1, a second side 64 and a width dimension 66 extending between the first side 62 of the cane supporting plate 60 and the second side 64 of the cane supporting plate 60. The cane supporting plate 60 further includes a first end 68, a second end 70 and a length dimension 72 extending between the first end 68 of the cane supporting plate 60 and the second end 70 of the cane supporting plate 60. Cane supporting plate 60 further includes a first face 74, a second face 76 and a thickness dimension 78 extending between the first face 74 of the cane supporting plate 60 and the second face 76 of the cane supporting plate 60.

A bore 80 is defined through the cane supporting plate 60 from the first face 74 of the cane supporting plate 60 to the second face 76 of the cane supporting plate 60. Bore 80 is sized to snugly receive cane C and hold that cane when the cane is moved into the bore 80 as indicated by arrow CA in FIG. 2.

The length dimension 28 of the base plate 16 is equal to the length dimension 72 of the cane supporting plate 60 and the width dimension 22 of the base plate 16 is equal to the width dimension 66 of the cane supporting plate 60 and the thickness dimension 34 of the base plate 16 is equal to the thickness dimension 78 of the cane supporting plate 60. The first end 24 of the base plate 16 is co-planar with the first end 68 of the cane supporting plate 60, the second end 26 of the base plate 16 is co-planar with the second end 70 of the cane supporting plate 60. The first side 18 of the base plate 16 is parallel with the first side 62 of the cane supporting plate 60 and the second side 20 of the base plate 16 is parallel with the second side 64 of the cane supporting plate 60.

The second element 54 of the hinge unit 50 is fixed to the first side 62 of the cane supporting plate 60 so that the cane supporting plate 60 and the base plate 16 can move relative to each other.

The cane supporting plate 60 is movable with respect to the base plate 16 between a first position shown in FIG. 1 in which the first face 30 of the base plate 16 and the first face 74 of the cane supporting plate 60 are spaced apart from each other and are co-planar with each other and a second position in which the first face 74 of the cane supporting plate 60 is in abutting contact with the first face 30 of the base plate 16 and the first sides 19, 62 of the base plate 16 and the cane supporting plate 60 are congruent with each other and the second sides 20, 64 of the base plate 16 and the cane supporting plate 60 are congruent with each other and the first ends 24, 68 of the base plate 16 and the cane supporting plate 60 are congruent with each other and the second ends 26, 70 of the base plate 16 and the cane supporting plate 60 are congruent with each other.

Persons who ambulate with a cane and who also use a wheelchair for mobilization would adjust the cane supporting plate 60 into a horizontal position before getting out of the wheelchair. The horizontal position is needed for accessibility of the cane holder portion of the holder 10. A person in the seated position places the cane into the cane holder 10 before standing. This gives the person the opportunity to use both hands to push up from the chair versus using only one hand to stand. When in a standing position, the person will then take the cane out of the cane holder 10 and proceed to ambulate. When it is time to ambulate back to the wheelchair, he or she would walk close to the wheelchair, place the cane into the cane holder 10 and then hold onto the chair, turn around and sit down. The holder of the present invention thus presents elements that allow precautions which are necessary for the stability and safety of persons who lack stability of the upper and lower extremities.

It is understood that while certain forms of the present invention have been illustrated and described herein, it is not to be limited to the specific forms or arrangements of parts described and shown.

What is claimed and desired to be covered by letters patent is:

1. A holder for a cane comprising:

a) a wheelchair element;

b) a body unit which is releasably attached to said wheelchair element when in an operative condition, said body unit including (1) a base plate having (A) a first side, (B) a second side, (C) a width dimension extending between the first side and the second side, (D) a first end, (E) a second end, (F) a length dimension extending between the first end and the second end, (G) a first face, (H) a second face, and (I) a thickness dimension extending between the first face and the second face, (2) a gripping element on the first side of the base plate, the gripping element including (A) a U-shaped body having an inner diameter and which is releasably mounted on said wheelchair element when in an operative condition, (B) a first end on the U-shaped body, and (C) a second end on the U-shaped body, the second end of the U-shaped body being spaced apart from the first end of the U-shaped body, (3) a hinge unit on the second side of the base plate, the hinge unit including (A) a first element fixed to the second side of the base plate, and (B) a second element rotatably attached to the first element of the hinge unit, (4) a cane supporting plate having (A) a first side, (B) a second side, (C) a width dimension extending between the first side of the cane supporting plate and the second side of the cane supporting plate, (D) a first end, (E) a second end, (F) a length dimension extending between the first end of the cane supporting plate and the second end of the cane supporting plate, (G) a first face, (H) a second face, (I) a thickness dimension extending between the first face of the cane supporting plate and the second face of the cane supporting plate, and (J) a bore through the cane supporting plate from the first face of the cane supporting plate to the second face of the cane supporting plate, (5) the length dimension of the base plate being equal to the length dimension of the cane supporting plate and the width dimension of the base plate being equal to the width dimension of the cane supporting plate and the thickness dimension of the base plate being equal to the thickness dimension of the cane supporting plate, and (6) the second element of the hinge unit being fixed to the first side of the cane supporting plate;

c) the first end of the base plate being co-planar with the first end of the cane supporting plate, the second end of the base plate being co-planar with the second end of the cane supporting plate;

d) the first side of the base plate being parallel with the first side of the cane supporting plate and the second side of the base plate being parallel with the second side of the cane supporting plate;

e) the cane supporting plate being movable with respect to the base plate between a first position in which the first face of the base plate and the first face of the cane supporting plate are spaced apart from each other and are co-planar with each other and a second position in which the first face of the cane supporting plate is in abutting contact with the first face of the base plate and the first sides of the base plate and the cane supporting plate are congruent with each other and the second sides of the base plate and the cane supporting plate are congruent with each other and the first ends of the base plate and the cane supporting plate are congruent with each other and the second ends of the base plate and the cane supporting plate are congruent with each other.

2. The cane holder as described in claim 1 wherein said wheelchair element includes an arm of the wheelchair.

* * * * *